United States Patent
Sundholm

(10) Patent No.: US 10,497,290 B2
(45) Date of Patent: Dec. 3, 2019

(54) PROTECTIVE ELEMENT OF AN ELECTRONIC PRICE LABEL AND ELECTRONIC PRICE LABEL ARRANGEMENT

(71) Applicant: MARIELLA LABELS OY, Vantaa (FI)

(72) Inventor: Göran Sundholm, Tuusula (FI)

(73) Assignee: MARIELLA LABELS OY, Vantaa (FI)

( * ) Notice: Subject to any disclaimer, the term of this patent is extended or adjusted under 35 U.S.C. 154(b) by 0 days.

(21) Appl. No.: 16/069,616

(22) PCT Filed: Jan. 10, 2017

(86) PCT No.: PCT/FI2017/050009
§ 371 (c)(1),
(2) Date: Jul. 12, 2018

(87) PCT Pub. No.: WO2017/121924
PCT Pub. Date: Jul. 20, 2017

(65) Prior Publication Data
US 2019/0012937 A1    Jan. 10, 2019

(30) Foreign Application Priority Data

Jan. 13, 2016  (FI) ..................................... 20165017
Feb. 25, 2016  (FI) ..................................... 20165146

(51) Int. Cl.
*G09F 3/20* (2006.01)
*G09F 3/00* (2006.01)
(Continued)

(52) U.S. Cl.
CPC ........... *G09F 3/208* (2013.01); *G06K 19/077* (2013.01); *G09F 3/0297* (2013.01); *G09F 3/12* (2013.01); *G09F 3/204* (2013.01)

(58) Field of Classification Search
CPC .......... G09F 3/208; G09F 3/0297; G09F 3/12; G09F 3/204; G09F 3/20
See application file for complete search history.

(56) References Cited

U.S. PATENT DOCUMENTS 2,548,104 A * 4/1951 Frison .................. A01K 11/001
                                                          24/674
2,930,154 A * 3/1960 Rosen ....................... G09F 3/12
                                                            40/1.5
(Continued)

FOREIGN PATENT DOCUMENTS

CN    103310704 A    9/2013
EP    1 990 790 A1   11/2008
(Continued)

OTHER PUBLICATIONS

International Search Report, issued in PCT/FI2017/050009, dated Mar. 15, 2017.
(Continued)

*Primary Examiner* — Gary C Hoge
(74) *Attorney, Agent, or Firm* — Birch, Stewart, Kolasch & Birch, LLP

(57) ABSTRACT

An electronic price label arrangement and a protective element of an electronic price label, which protective element includes an envelope part, which comprises a front wall, a rear wall and at least one side wall. A space for the electronic price label is arranged between the front wall and rear wall of the envelope part, and the envelope part is further adapted to at least partly surround, on the front side and on the rear side and on at least one other side of the electronic price label, an electronic price label inside the envelope part and/or an electronic price label to be placed inside the envelope part.

16 Claims, 5 Drawing Sheets

(51) Int. Cl.
*G09F 3/12* (2006.01)
*G06K 19/077* (2006.01)

(56) References Cited

U.S. PATENT DOCUMENTS

| | | | | | |
|---|---|---|---|---|---|
| 5,178,311 | A | * | 1/1993 | McBride | A63C 11/00 224/191 |
| 5,743,568 | A | * | 4/1998 | Smith, III | G09F 3/20 283/116 |
| 5,845,424 | A | * | 12/1998 | Mitchell | G09F 3/20 40/661.06 |
| 6,000,611 | A | * | 12/1999 | Dalton | G09F 3/204 235/383 |
| 6,119,990 | A | * | 9/2000 | Kump | A47F 5/0068 211/57.1 |
| 6,126,125 | A | * | 10/2000 | Dalton | G09F 3/204 248/205.2 |
| 6,151,823 | A | * | 11/2000 | Gregory-Gillman | G09F 3/20 383/35 |
| 6,197,396 | B1 | * | 3/2001 | Haas | G09F 3/10 283/81 |
| 6,217,966 | B1 | * | 4/2001 | Finster | G09F 3/0288 283/81 |
| 6,279,170 | B1 | * | 8/2001 | Chu | G09F 3/208 2/246 |
| 2005/0262748 | A1 | * | 12/2005 | Curtis | G09F 3/14 40/649 |
| 2007/0013479 | A1 | * | 1/2007 | Goel | G06Q 30/06 340/5.91 |
| 2007/0289186 | A1 | * | 12/2007 | Wallace | G09F 3/14 40/661 |
| 2008/0141575 | A1 | * | 6/2008 | Keating | G09F 3/204 40/661.11 |
| 2008/0222934 | A1 | * | 9/2008 | Dworetz | G09F 3/20 40/661 |
| 2008/0295377 | A1 | * | 12/2008 | Bollinger | G09F 1/04 40/661.09 |
| 2009/0179825 | A1 | | 7/2009 | Enarvi et al. | |
| 2009/0241392 | A1 | * | 10/2009 | Long | G09F 3/20 40/661 |
| 2009/0309736 | A1 | | 12/2009 | Heurtier | |
| 2010/0079284 | A1 | | 4/2010 | Perez et al. | |
| 2010/0088937 | A1 | * | 4/2010 | Lee | G09F 3/20 40/642.02 |
| 2013/0036636 | A1 | * | 2/2013 | Karhuketo | G09F 3/204 40/299.01 |
| 2015/0035674 | A1 | | 2/2015 | Karhuketo | |
| 2016/0104397 | A1 | * | 4/2016 | Kim | G09F 13/20 40/5 |

FOREIGN PATENT DOCUMENTS

| | | |
|---|---|---|
| FI | 20050192 A | 8/2006 |
| GB | 2518160 A | 3/2015 |
| WO | WO 2009/103857 A1 | 8/2009 |

OTHER PUBLICATIONS

Written Opininon of the International Searching Authority, issued in PCT/FI2017/050009, dated Mar. 15, 2017.

* cited by examiner

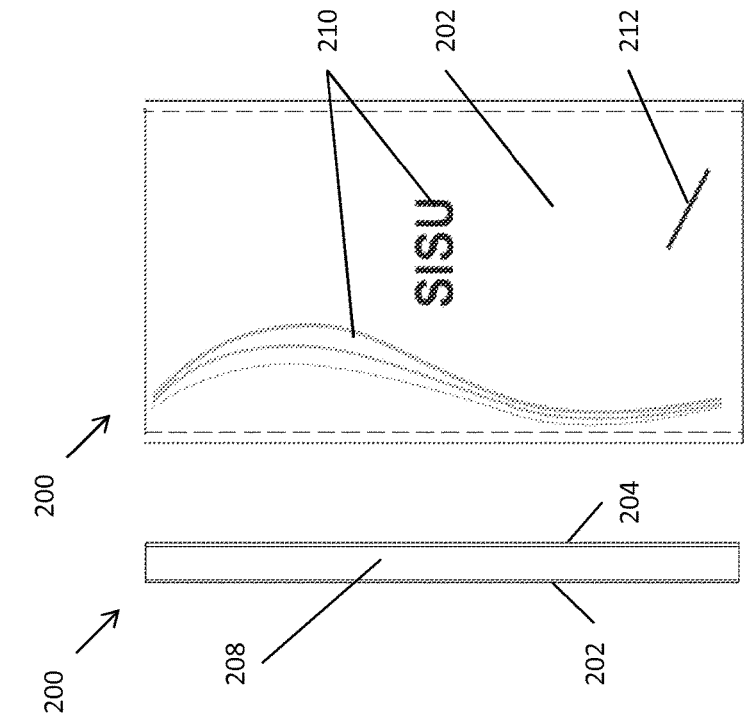
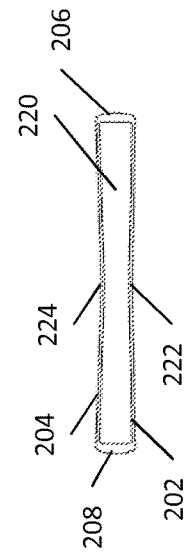
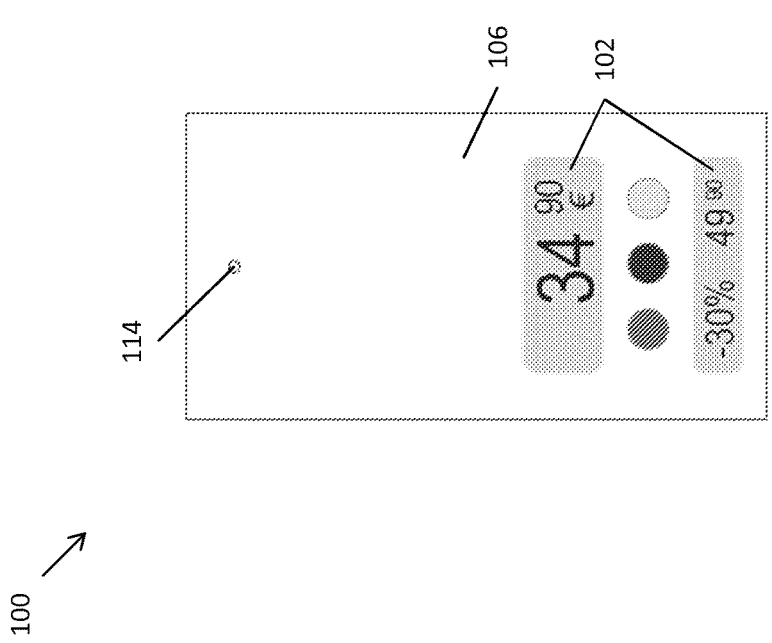
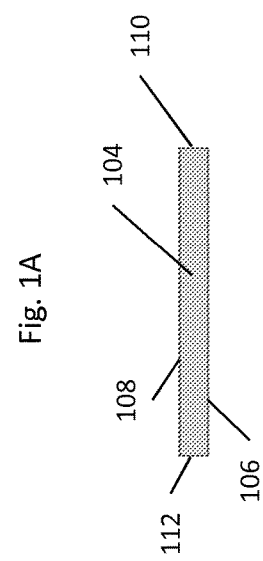

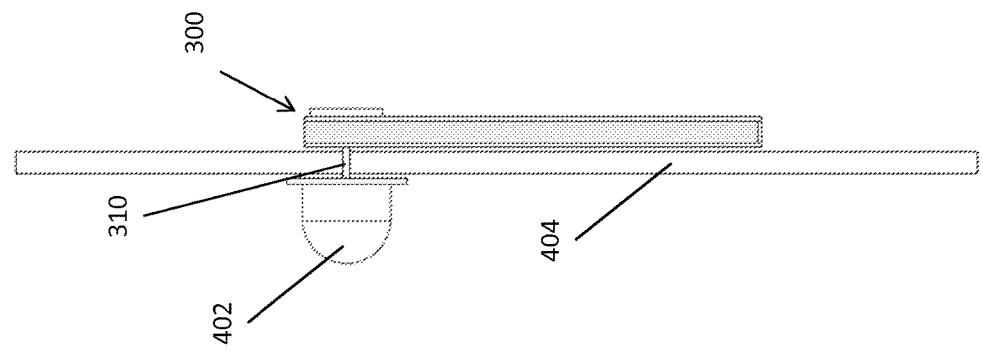
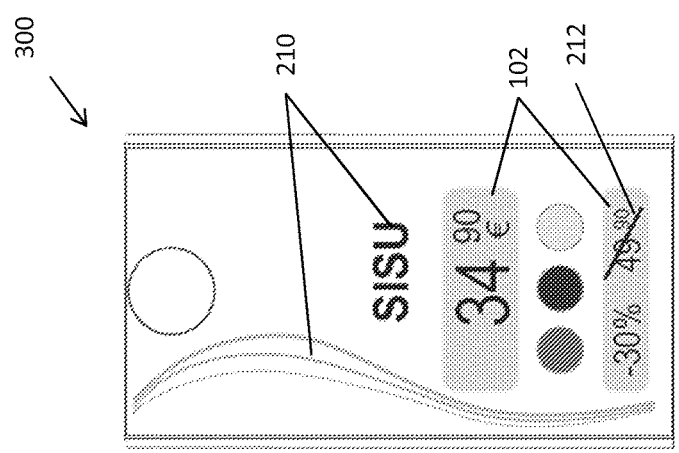
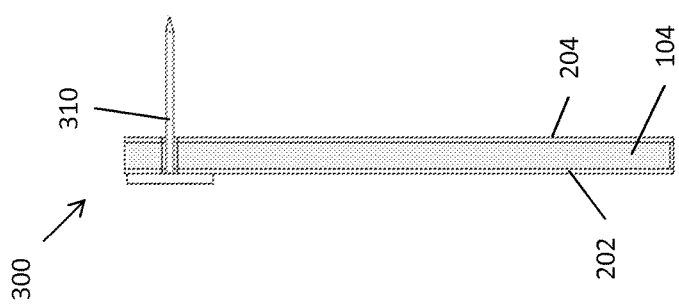
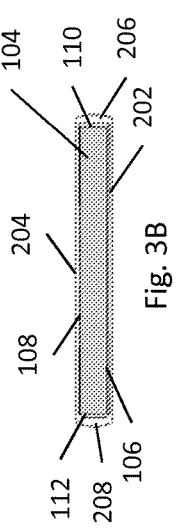

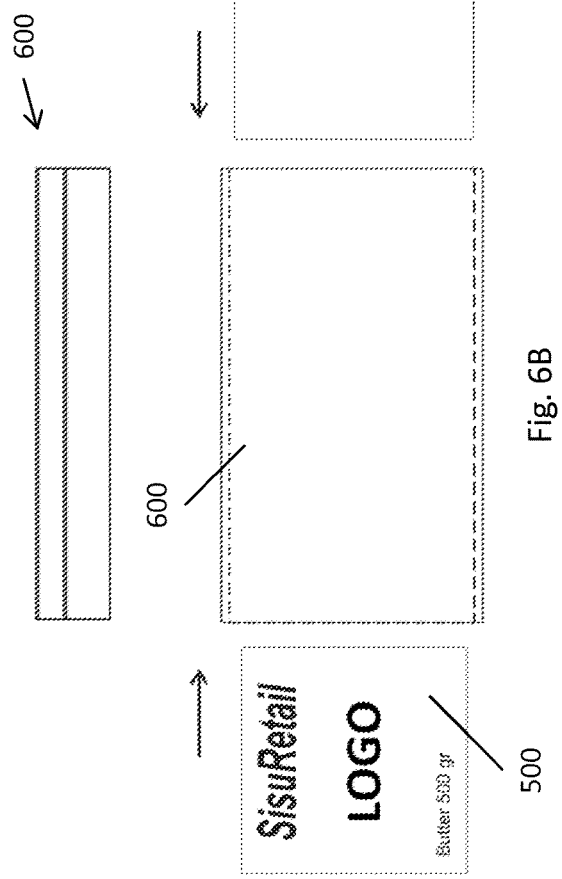
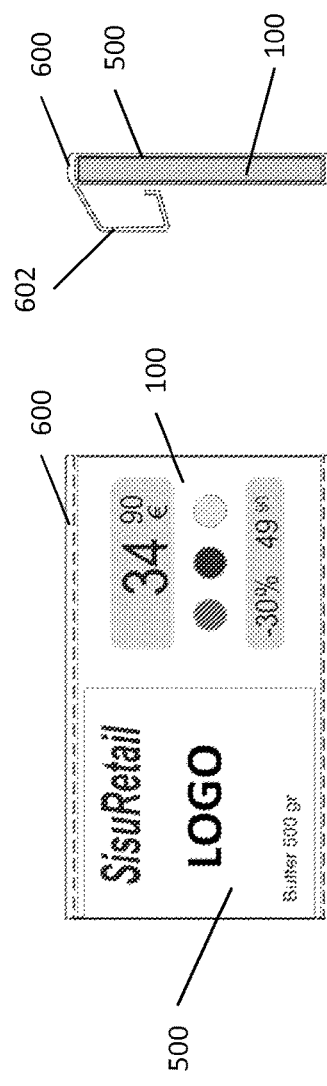
Fig. 6A
Fig. 6B
Fig. 6C
Fig. 6D

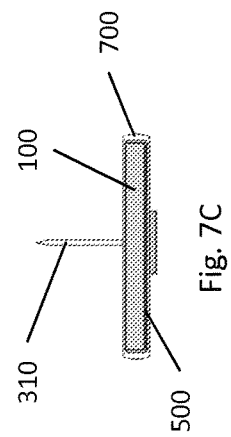
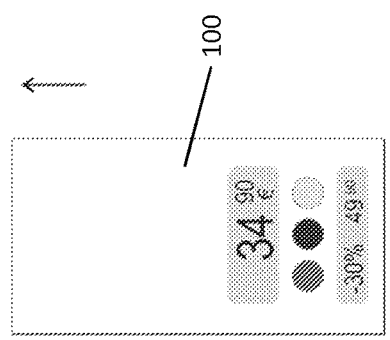
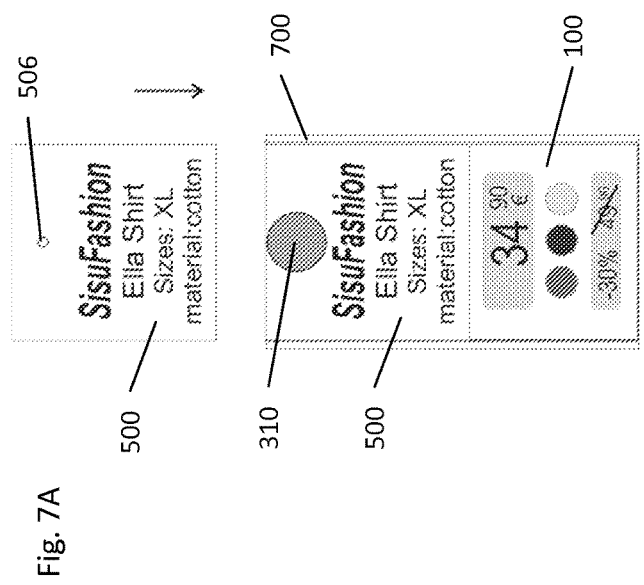

PROTECTIVE ELEMENT OF AN ELECTRONIC PRICE LABEL AND ELECTRONIC PRICE LABEL ARRANGEMENT

FIELD OF THE INVENTION

The invention relates to electronic price label systems and more particularly to an electronic price label and to a protective element of an electronic price label.

BACKGROUND OF THE INVENTION

Conventionally the price information of price labels is changed manually when the price of a product changes. New price labels are printed onto paper or onto a corresponding material and these labels, with their new price markings, are manually disposed in locations reserved on products or on shelves in sales premises. Consequently, an employee must first find the correct location of the price label to be updated and after this the previous price label is removed and discarded and the new price label is placed into its position. One drawback, among others, in this arrangement is that the arrangement is very laborious and the risk of errors is high. In the case of an error, e.g. a situation can arise in which the price information of a price label on the shelves is at variance with the price information of the checkout system.

In order to avoid the drawbacks described above, electronic systems have been developed wherein electronic labels are fastened onto the products or near the products, wherein the price information of the products can be changed centrally from the control center, or corresponding, of the system. This enables and significantly speeds up the updating of price information. The information on the displays can be updated in a wired or wireless manner, depending on the system.

Known from publication WO 2009/103857A1 is a system in which wireless electronic price labels are used. The properties of the wireless, layer-structured, electronic price labels presented in the publication are excellent. Some situations have arisen, however, in which an electronic price label, and more particularly its outer surface, has become damaged in use. Situations have also arisen in which it is desired to change the appearance of a price label or it is desired to alter the appearance of a price label e.g. conform to that of the product brand.

SUMMARY OF THE INVENTION

The aim of the invention is to reduce the aforementioned problems and to simultaneously enable inexpensive and reliable protection of the desired appearance for an electronic price label.

The protective element of an electronic price label according to the invention is characterized by what is stated in claim 1.

The various embodiments of the protective element of the electronic price label according to the invention are characterized by what is stated in claims 2-6.

The electronic price label arrangement according to the invention is characterized by what is stated in claim 7.

The various embodiments of the electronic price label arrangement according to the invention are characterized by what is stated in claims 8-13.

The solution according to the invention has a number of important advantages when it is compared to solutions known in the art. For example, when compared to the electronic price labels known in the art that are described e.g. in publication WO2009103857, an electronic price label can be protected and stiffened by means of the protective element of the electronic price label according to the invention in such a way that it lasts in use without damage and wear.

A protective element is also replaceable if it becomes dirty or scratched. If a price label is provided with a replaceable battery, the protective element efficiently protects the lid of the battery. In one embodiment of the invention the protective element can also function as a cover for a battery compartment.

In one embodiment of the invention various markings can also be made on the protective element. In this case the appearance of the electronic price label can be changed without needing to change the electronic price label itself. For example, a trademark or logo visible in connection with a price label can be changed in this way. By means of this solution a large amount of generic price labels can be fabricated, which can be personalized by means of the protective element so as to have the type of appearance desired. In this case the unit costs of electronic price labels can be reduced because large amounts of similar electronic price labels can be fabricated.

In one embodiment, by means of markings made on the protective element, additional markings can also be formed on top of the display part of an electronic price label, which additional markings do not therefore need to be presented on the display of the electronic price label itself. Economies can be made by means of this solution e.g. in the number of segments and/or pixels and/or different screen colors needed on the display.

In one embodiment of the invention also a product information part can be fitted inside a protective element. The product information part comprises on its front side information associated with a product, such as the product name, a logo, text and/or an image or images. The product information part is fitted essentially inside the protective element between the protective element and the electronic price label in such a way that the front side of the product information part shows on the front part of the assembly formed by the electronic price label and the protective element. An advantage of this embodiment is that information associated with a product can be presented in connection with a price label without the need to show it on the display of the price label. While economies can therefore be made e.g. in the number of segments and/or pixels and/or different screen colors needed on the display by means of this solution, the presentation in connection with a product of visual information associated with the product is enabled. The product information part can, if necessary, be replaced with a new one without needing to change the electronic price label and/or the protective element.

DESCRIPTION OF THE FIGURES

In the following, the invention will be described in more detail by the aid of some examples of its embodiment with reference to the attached drawings, wherein FIG. 1A presents the structure of an electronic price label according to one embodiment of the invention as seen from the front side of the electronic price label, FIG. 1B presents a cross-section of an electronic price label according to one embodiment of the invention as seen from above the electronic price label, FIG. 2A presents the protective element of an electronic price label according to one embodiment of the invention as viewed from the front, FIG. 2B presents a cross-section of a protective element of an electronic price label according to one embodiment of the invention as viewed from above, FIG. 2C presents the protective element of an electronic price label according to one embodiment of the invention as viewed from the side, FIG. 3A presents a front view of a combination of an electronic price label and a protective element fastened to it according to one embodiment of the invention, FIG. 3B presents a top view of a cross-section of a combination of an electronic price label and a protective element fastened to it according to one embodiment of the invention, FIG. 3C presents a side view of a combination of an electronic price label and a protective element fastened to it according to one embodiment of the invention, FIG. 4 presents the fastening to a product of an electronic price label and a protective element fastened to it according to one embodiment of the invention, FIG. 6A presents the protective element of an electronic price label according to one embodiment of the invention as viewed from above, FIG. 6B presents a product information part and an electronic price label according to one embodiment of the invention, which are fittable inside a protective element, FIG. 6C presents a front view of a product information part and an electronic price label according to one embodiment of the invention, which have been fitted inside a protective element, FIG. 6D presents a side view of a product information part and an electronic price label according to one embodiment of the invention, which have been fitted inside a protective element, FIG. 7A presents the product information part and an electronic price label according to one embodiment of the invention, which are fitted inside a protective element, FIG. 7B presents a side view of a product information part and an electronic price label according to one embodiment of the invention, which have been fitted inside a protective element, and FIG. 7C presents a top view of a product information part and an electronic price label according to one embodiment of the invention, which have been fitted inside a protective element.

DETAILED DESCRIPTION OF THE INVENTION

Figure 5A:
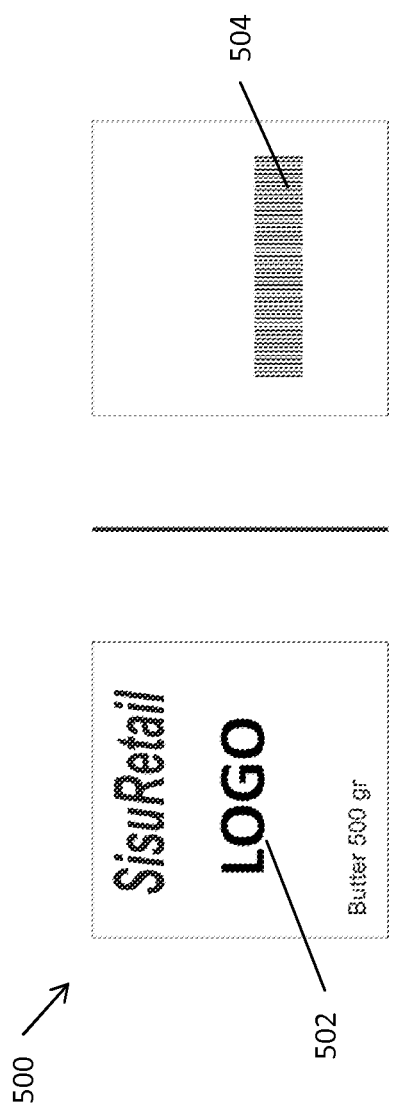
FIG. 5A presents the product information part according to one embodiment of the invention.

FIGS. 1A and 1B present a diagrammatic and simplified view of an electronic price label 100 according to the invention. FIG. 1A presents the electronic price label as viewed from the front, and FIG. 1B the electronic price label as viewed from above.

An electronic price label comprises a front side 106, a rear side 108, and four sides, of which two sides 110, 112 are marked in FIG. 1B. The electronic price label 100 comprises a display 102, such as e.g. a laminate display, which is arranged to display the price information and/or product information of a product. Also other information relating to a product, such as e.g. the name of the product, can be presented on the front surface of an electronic price label. The frame part 104 of the electronic label can, in terms of its material and structure, be hard or, alternatively, elastic and flexible. The electronics of the electronic price label can be disposed inside the frame part 104 or in connection with it. The display 102 of then electronic price label is provided with display segments or pixels. The electronic price label 100 resembles a price label of paper, on which price label the required prices of products and other necessary symbols are formed by changing the colors of the segments or pixels of the display 102. The display 102 can be dichromatic or polychromatic. The electronic price label can have an aperture 114 for fastening the electronic price label to a product.

In one embodiment of the invention one layer of the display 102 is e.g. an active ink layer. The ink layer contains a number of microcapsules, which are filled with a liquid and which contain e.g. essentially black particles, which have a positive surface charge and the location of which is controlled with an electrical field in such a way that in the desired display segments the black particles are on, wherein the aforementioned display segment appears black when it is viewed from above, and in the other display segments the white particles are on, wherein these display segments appear white when viewed from above. The background of the display 102 is formed from the same microcapsules, wherein e.g. price information can be displayed as dark numbers against a light background or, if so desired, vice versa. This type of display, which is used, can be e.g. the electrophoretic microcapsule display laminate described in Finnish patent application FI 20050192. In one embodiment of the invention the surface of the electronic price label is essentially planar.

FIGS. 2A-2C present a protective element 200 of an electronic price label according to one embodiment of the invention. The protective element comprises an envelope part, which comprises a front wall 202, a rear wall 204 and at least one side wall. In the embodiment presented in FIGS. 2A-2C the envelope part has two side walls 206, 208 and a front wall 202 and a rear wall 204. A space 220 for the electronic price label is arranged between the front wall 202 and rear wall 204 of the envelope part. The envelope part is adapted to at least partly surround, on the front side 106 and on the rear side 108 as well as on at least one other side of the electronic price label, an electronic price label inside the envelope part and/or an electronic price label to be placed inside the envelope part. In one embodiment of the invention, such as e.g. in FIGS. 2A-2C, the envelope part is arranged in such a way that it essentially surrounds an electronic price label installed inside the envelope part. The dashed lines in FIG. 2A present the width of the space 220 remaining inside the envelope part.

In one embodiment of the invention the envelope part of the protective element can have three side walls and a front wall and a rear wall. In such a case one side wall is left open and an electronic price label can be pushed inside the envelope part of the protective element via this open side wall, e.g. the upper side wall.

The protective element further comprises a fastening arrangement, with which the protective element is adapted to be detachably fastened into position inside the envelope part placed around the electronic price label. In one embodiment of the invention the fastening arrangement is a separate fastening means. In another embodiment of the invention the fastening arrangement is arranged in the structure of the protective element or in connection with it. The fastening arrangement can also be a combination of the aforementioned fastening methods.

In one embodiment of the invention the fastening arrangement is formed from at least one wall of the envelope part, which wall is formed and/or shaped in such a way that it exerts pressure or compressive force on one of the surfaces of the electronic price label when the electronic price label is inside the envelope part. The walls of the envelope part can be e.g. essentially farther inward at the center point of the walls. In such a case the space remaining inside the envelope part is narrower at the center point of the walls, e.g. at the vertical center point of a wall. Pressure and/or compressive force can thus be exerted on the surfaces of an electronic price label installed inside an envelope part, in which case the electronic price label remains in its position by means of the compressive force caused by the narrower space at the center of the walls.

In the embodiment presented in FIGS. 2A-2C the fastening means is formed from the front wall 202 and the rear wall 204 of the envelope part of the protective element, which are arranged in such a way that the center point 222, 224 of the front and rear walls in essentially the vertical direction is farther inwards than the other areas of the front and rear wall. Thus the envelope part presses essentially tightly against the electronic price label, particularly at the point of the center part of the front wall 202 and the rear wall 204, when the electronic price label is placed inside the envelope part of the protective element.

The fastening arrangement can comprise an aperture in the protective element, though which aperture a locking pin is installable. The protective element can be kept in its position around the electronic price label by means of a locking pin pushed through the aperture in the protective element. In such a case other fastening arrangements for fastening the protective element to the electronic price label are not necessarily needed.

In one embodiment of the invention the fastening arrangement can be e.g. a protrusion on the protective element and/or on its envelope part and/or a tongue on the protrusion, in which case the electronic price label can be provided with a hole for the protrusion, and the protective element can be snapped into position attached to the electronic price label.

In one embodiment of the invention the protective element is of plastic material, e.g. bright and/or matt-surfaced plastic.

In one embodiment of the invention various markings 210 can also be made on the protective element. In this case the appearance of the electronic price label can be changed without needing to change the electronic price label itself. For example, a trademark or logo visible in connection with a price label can be changed in this way. In one embodiment by means of markings made on the protective element, additional markings 212 can also be formed on top of the display part of an electronic price label, which additional markings do not therefore need to be presented on the display of the electronic price label itself. The example of an additional marking presented in the figures is a line, with which the original price is crossed out.

In one embodiment of the invention the electronic price label and/or the protective element is/are provided with alignment parts, by means of which the aforementioned parts always become installed in the correct attitude.

FIGS. 3A-3C present a price label arrangement 300 formed from an electronic price label and a protective element. The price label arrangement 300 can be delivered to the bodies using the electronic price labels or to retail stores as prefabricated units, in which case it is quick and easy to take protected price labels into use.

The electronic price label arrangement comprises a protective element and an electronic price label installable inside the protective element. When the electronic price label is installed inside the protective element, the protective element at least partly surrounds the electronic price label on the front side and on the rear side as well as on at least one other side of the electronic price label. In the embodiment presented in FIGS. 3A-3C the protective element essentially surrounds the electronic price label on the front side 106 and on the rear side 108 as well as on two other sides 110, 112 of the electronic price label.

The electronic price label arrangement can further comprise a fastening means, which is adapted to detachably fasten the electronic price label to the protective element and/or the assembly formed by the electronic price label and the protective element to the product. The fastening means can comprise a locking pin 310 and a lock part and, in the electronic price label and/or protective element, an aperture for the locking pin. The locking pin can be a stud or spike and the lock part can be e.g. a lock openable by means of a magnet.

FIG. 4 presents how an electronic price label arrangement 400 according to the invention, the arrangement comprising a protective element and an electronic price label, can be fastened to a product 404 by means of a locking pin 310 and a locking part 402. The protective element can be fastened to the price label e.g. in such a way that at first the electronic price label is placed inside the protective element. After this, the fastening means 310 is pushed through the protective element and/or through the electronic price label and/or through an aperture in the protective element and/or in the electronic price label. After this the fastening means 310 is pushed through the product 404 or through an aperture in the product 404 and the locking part 402 is fastened to the second end of the fastening means 310, the locking part opening only with an opener intended for it. In this way the assembly formed by the electronic price label and the protective element is firmly attached to the electronic price label. If a lock opening by means of a magnet is used as a locking part, the fastening can be opened with a lock opener comprising a magnet, such as is used e.g. at checkout counters in conjunction with removing theft alarms. Other types of fastening means, such as using screws, for fastening the protective element to the price label are also possible.

In the manner described above, an electronic price label remains with the protective element reliably attached to a product but can easily be removed from the product with appropriate openers, e.g. at the checkout counter. In this case if the electronic price label and/or the locking part comprises a component of a theft alarm system, the component can be removed at the checkout counter. The product 404 can be e.g. an article of clothing.

In one embodiment of the invention also a product information part can be fitted inside a protective element. The product information part is fitted essentially inside the protective element between the protective element and the electronic price label in such a way that the front side of the product information part shows on the front side of the assembly formed by the electronic price label and the protective element. The product information part can be replaced, e.g. if it is desired to update the information and/or images associated with a product, without it being necessary to make modifications to the price label and/or protective element. The product information part can comprise an identifier associated with the product, electronic price label and/or the product information part. The identifier can be a machine-readable identifier, such as a barcode and/or an RFID tag. An identifier can be linked to a certain electronic price label and/or to a certain product by means of the POS system or checkout system of the store.

FIG. 5A presents a product information part according to one embodiment of the invention as viewed from the front, from the side and from the rear. The product information part 500 comprises on its front side information 502 associated with a product, such as the product name, a logo, text and/or an image or images. In the embodiment of FIG. 5A the product information part 500 comprises, on the rear side of the product information part, an identifier 504 associated with the product, electronic price label and/or the product information part, the identifier in the case of this example being a barcode.

Figure 5B:
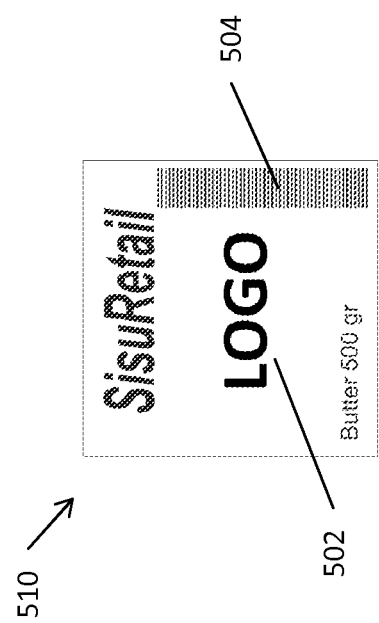
FIG. 5B presents the product information part according to one embodiment of the invention.

FIG. 5B presents a product information part 510 according to another embodiment of the invention. The product information part 510 of FIG. 5B is otherwise similar to the product information part of FIG. 5A but the identifier 504, which in this example is a barcode, is situated on the front side of the product information part 510, in which case it is visible when the product information part 510 is fitted into position inside the protective element. In the solution of this embodiment the identifier can easily be read e.g. with a mobile device and the identifier once read can be used e.g. in picking products or as an aid for receipting purchases made from the shopping lists on the mobile devices of customers.

The product information part can be e.g. of paper and it can be printed with a label printer e.g. in a back room of the store. The identifier of the product information part can be prefabricated in the product information part or the identifier can be attached to it when the product information part is prepared. The identifier can be printed onto the product information part e.g. at essentially the same time as the information for the front side of the product information part is printed. When the product information part is taken near an electronic price label that is in the proximity of a product, the identifier of the product information part can be read and associated as belonging to a certain electronic price label. In this way an electronic price label can be associated with a certain product information part and at the same time to a certain product because the identifier of the product information part is associated in the system with a certain product. In such a case the price of the product in question will be visible on the display of the electronic price label linked to it. The identifiers of the product information part and/or of the electronic price label can be read e.g. with portable devices with which barcodes and/or RFID tags can be read, and a connection can be formed to the POS system or checkout system of the store. When the location of a product is changed, the product information part is taken away from being in connection with the electronic price label in the old location. The product information part can be taken to the new location of the product and linked there to the electronic price label in the location in question in the manner described above. Also, if a product information part is replaced with a new product information part e.g. when the information and/or images associated with a product are updated, the linking of a new product information part can be performed, if so desired, in the manner described above.

FIG. 6B presents a product information part and an electronic price label according to one embodiment of the invention, which are fittable inside a protective element. The product information part 500 and the electronic price label 100 can be pushed inside the protective element 600 in such a way that the product information part 500 remains essentially between the electronic price label 100 and the protective element 600. The product information part is arranged in such a way that it covers a part of the front surface of the electronic price label 100 but not the display part or display parts of the electronic price label.

FIG. 6C presents the product information part 500 and electronic price label 100 presented in FIG. 6B above, which have been fitted inside the protective element 600. The assembly formed by the product information part 500, the electronic price label 100 and the protective element 600 can be arranged in the proximity of the product connected to it, e.g. on the edge of a shelf at the point of the product.

FIG. 6A presents the protective element 600 of an electronic price label according to the embodiment of FIGS. 6B and 6C, as viewed from above. FIG. 6D presents a side view of a product information part and an electronic price label according to the same embodiment, which have been fitted inside the protective element. The protective element 600 presented in FIG. 6B is otherwise also similar to the other protective elements presented in this application, but now it can comprise a fastening arrangement 602, by means of which the protective element can be fastened e.g. to the edge of a shelf. The fastening arrangement 602 can be formed to be a fixed part of the protective element and/or essentially the whole length of the protective element. In this case the use of a locking pin is not necessarily needed.

FIG. 7A presents the product information part and an electronic price label according to one embodiment of the invention, which have been fitted inside a protective element. The product information part 500 and the electronic price label 100 can be pushed inside the protective element 700 in such a way that the product information part 500 remains essentially between the electronic price label 100 and the protective element 700. The product information part is arranged in such a way that it covers a part of the front surface of the electronic price label 100 but not the display part or display parts of the electronic price label. The protective element 700 presented in FIG. 7A is otherwise similar to the other protective elements presented in this application. In the embodiment presented in FIG. 7A the product information part 500 can further comprise an aperture 506, through which a locking pin 310 is installable. In this case the assembly formed by the product information part 500, the electronic price label 100 and the protective element 700 can be fastened to a product by means of a locking pin and in this case the product information part 500 remains in position inside the protective element 700. The locking pin 310 can also be pushed through the material of the product information part 500, in which case a prefabricated aperture is not necessarily needed.

FIG. 7B presents a side view of the product information part 500 and electronic price label 100 according to the embodiment of FIG. 7A, which have been fitted inside the protective element 700 and fastened to each other by means of the locking pin 310. FIG. 7C presents the embodiment of FIGS. 7A and 7B as viewed from above.

In one embodiment of the invention the frame part, front surface and/or rear surface of the electronic price label and/or the protective element are essentially flexible. In one embodiment of the invention the frame part, front surface and/or rear surface of the price label and/or the protective element are essentially hard and inflexible.

If a replaceable battery is used in the price label, the protective element efficiently protects also the lid of the battery. In one embodiment of the invention the protective element can also function as a cover for a battery compartment.

It is obvious to the person skilled in the art that the invention is not limited to the embodiments presented above, but that it can be varied within the scope of the claims presented below. The characteristic features presented in the description mentioned in conjunction with each other can also be independent characteristic features.

The invention claimed is:

1. A protective element of an electronic price label, comprising:
   an envelope part, the envelope part comprising a front wall, a rear wall and two side walls, each side wall extending between the front wall and rear wall to space the front wall from the rear wall at the side walls;
   a space for the electronic price label formed between the front wall, rear wall and two side walls of the envelope part; and
   a fastening arrangement to detachably fasten the electronic price label into position inside the envelope part,
   wherein the envelope part is adapted to surround, on the front side and on the rear side and on two other sides of the electronic price label inside the envelope part,
   wherein the two side walls maintain the front wall and rear wall apart by a first distance, and
   wherein the fastening arrangement is formed by a recess in the front wall or rear wall of the envelope part so that a distance between the front wall and the rear wall at the recess is less than the first distance and that at least one of the front wall and the rear wall presses against the electronic price label when the electronic price label has been placed inside the envelope part of the protective element.

2. The protective element according to claim 1, wherein the fastening arrangement comprises an aperture in the protective element, through which aperture a locking pin is installable.

3. The protective element according to claim 2, wherein the protective element is of plastic material.

4. The protective element according to claim 2, wherein the protective element comprises a fastener configured to fasten the protective element to a shelf.

5. The protective element according to claim 1, wherein the protective element is of plastic material.

6. The protective element according to claim 5, wherein the protective element of plastic material is bright and/or matt-surfaced plastic.

7. The protective element according to claim 5, wherein the protective element comprises a fastener configured to fasten the protective element to a shelf.

8. The protective element according to claim 1, wherein the protective element comprises a fastener configured to fasten the protective element to a shelf.

9. An electronic price label arrangement, comprising:
   a protective element of an electronic price label, comprising:
      an envelope part, the envelope part comprising a front wall, a rear wall and two side walls, each side wall extending between the front wall and rear wall to space the front wall from the rear wall at the side walls;
      a space for the electronic price label formed between the front wall, rear wall and two side walls of the envelope part; and
      a fastening arrangement to detachably fasten the electronic price label into position inside the envelope part;
      wherein the envelope part is adapted to surround, on the front side and on the rear side and on two other sides of the electronic price label inside the envelope part; and
   an electronic price label, which is installable or installed inside the protective element in such a way that the protective element at least partly surrounds the electronic price label on the front side and on the rear side and on at least one other side of the electronic price label.

10. The electronic price label arrangement according to claim 9, further comprising:
    a product information part, which comprises information relating to a product; and
    an identifier.

11. The electronic price label arrangement according to claim 10, wherein the product information part, electronic price label and protective element are arranged in such a way that the product information part is finable essentially inside the protective element between the protective element and the electronic price label.

12. The electronic price label arrangement according to claim 10, wherein the information relating to a product is a logo, mark, image and/or text, and the identifier is a barcode or RFID tag.

13. A protective element of an electronic price label, comprising:
    an envelope part, the envelope part comprising a front wall, a rear wall and two side walls; and
    a space for the electronic price label arranged between the front wall and rear wall of the envelope part,
    a fastening arrangement, with which the protective element is adapted to be detachably fastened into position inside an envelope part placed around the electronic price label,
    wherein the envelope part is adapted to essentially surround, on the front side and on the rear side and on two other sides of the electronic price label, an electronic price label inside the envelope part and/or an electronic price label to be placed inside the envelope part, and
    wherein the electronic price label arrangement further comprises a fastener, which is adapted to detachably fasten the electronic price label to the protective element or the assembly formed by the electronic price label and the protective element to the product.

14. The electronic price label arrangement according to claim 13, wherein the fastener comprises a locking pin and a lock part and the electronic price label and/or protective element is provided with an aperture for the locking pin.

15. The electronic price label arrangement according to claim 14, wherein the locking pin is a stud or spike and the lock part is a lock openable by a magnet.

16. A protective element of an electronic price label, comprising:
    an envelope part, the envelope part comprising a front wall, a rear wall and two side walls;
    a space for the electronic price label arranged between the front wall and rear wall of the envelope part;
    a fastening arrangement, with which the protective element is adapted to be detachably fastened into position inside an envelope part placed around the electronic price label; and
    a product information part, which comprises information relating to a product,
    wherein the envelope part is adapted to essentially surround, on the front side and on the rear side and on two other sides of the electronic price label, an electronic price label inside the envelope part and/or an electronic price label to be placed inside the envelope part, and wherein the product information part is adapted to be fastened into position by the same fastening arrangement with which the protective element is adapted to be detachably fastened into position inside an envelope part placed around the electronic price label.

* * * * *